UNITED STATES PATENT OFFICE.

JOHANN GUSTAV BIERICH, OF MENKENHOF, RUSSIA.

PROCESS OF PRODUCING HOMOGENEOUS HORN SUBSTANCES.

SPECIFICATION forming part of Letters Patent No. 659,358, dated October 9, 1900.

Application filed October 5, 1899. Serial No. 732,690. (No specimens.)

*To all whom it may concern:*

Be it known that I, JOHANN GUSTAV BIERICH, a subject of the Czar of Russia, residing at Menkenhof, near Lievenhof, Russia, have invented new and useful Improvements in Processes of Producing a Homogeneous Horn Substance, of which the following is a specification.

The object of this invention is the process for the production of a homogeneous horn substance from horn cuttings, horn shavings, powdered horn, or the like, the distinguishing feature of which is that the material to be worked up after being thoroughly cleaned is mixed with about one per cent. of flax-oil or one per cent. of glycerin and subjected to a temperature of 100° or more Celsius for about forty minutes or more at a pressure of about two hundred or more atmospheres, the air being excluded from the material.

The four principal factors—heat, addition, pressure, and time—vary in the process according to the quality of the horn substance which it is intended to produce. If it be desired to produce a hard brittle substance, it will be necessary to employ a high temperature without the addition of flax-oil or glycerin, while if a soft elastic substance be required it will be necessary to add flax-oil or glycerin and to employ a lower temperature but more time.

The horn substance produced by this process can be worked up like natural horn, and consequently can also be applied to the same purposes.

What I claim as my invention, and desire to secure by Letters Patent, is—

The process for producing homogeneous horn substance from horn cuttings, horn shavings and the like consisting in cleaning the material, mixing the same with glycerin, subjecting the mixture to a temperature of about 100° Celsius for about forty minutes and at a pressure of about two hundred atmospheres, said process being carried on under exclusion of air, substantially as described.

In witness whereof I have hereunto set my hand in presence of two witnesses.

J. G. BIERICH.

Witnesses:
   H. BURKMAN,
   FRITZ ABRAMOWSKI.